Oct. 28, 1947. V. A. RAYBURN 2,429,945
METHOD OF AND APPARATUS FOR SHEARING STRIPS OF PLASTIC MATERIAL
Filed Aug. 14, 1945 4 Sheets-Sheet 1
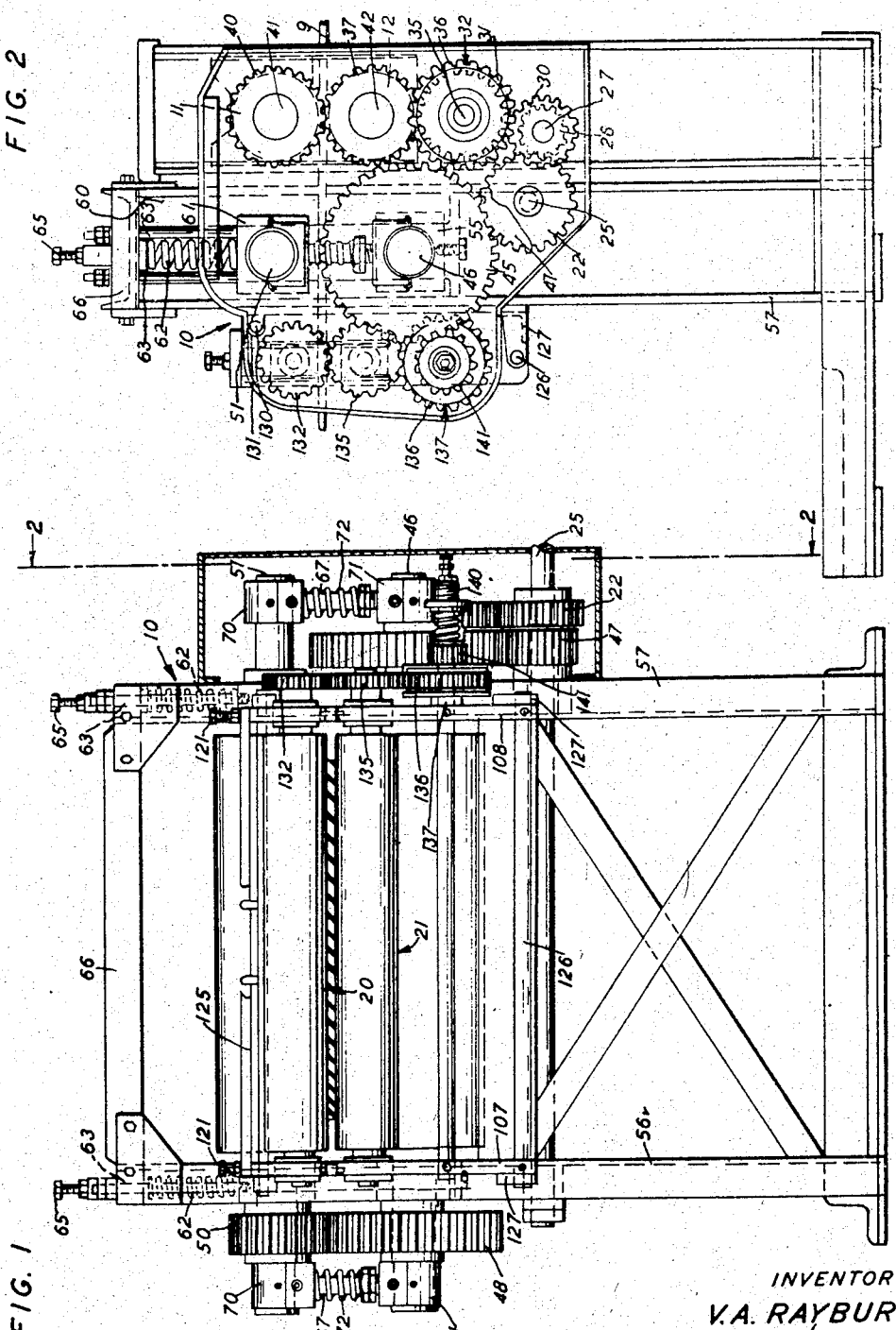
INVENTOR
V. A. RAYBURN
BY
ATTORNEY

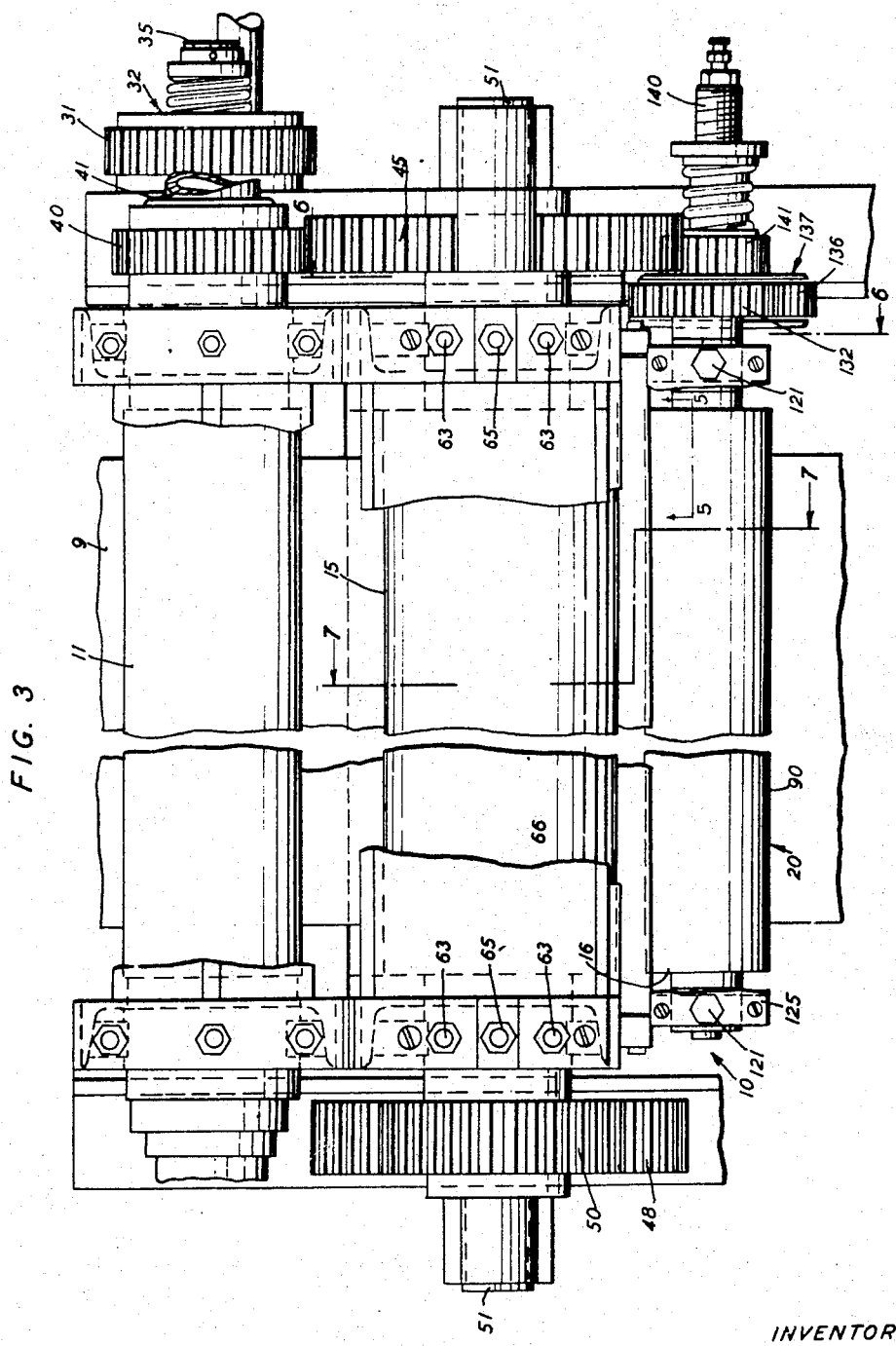

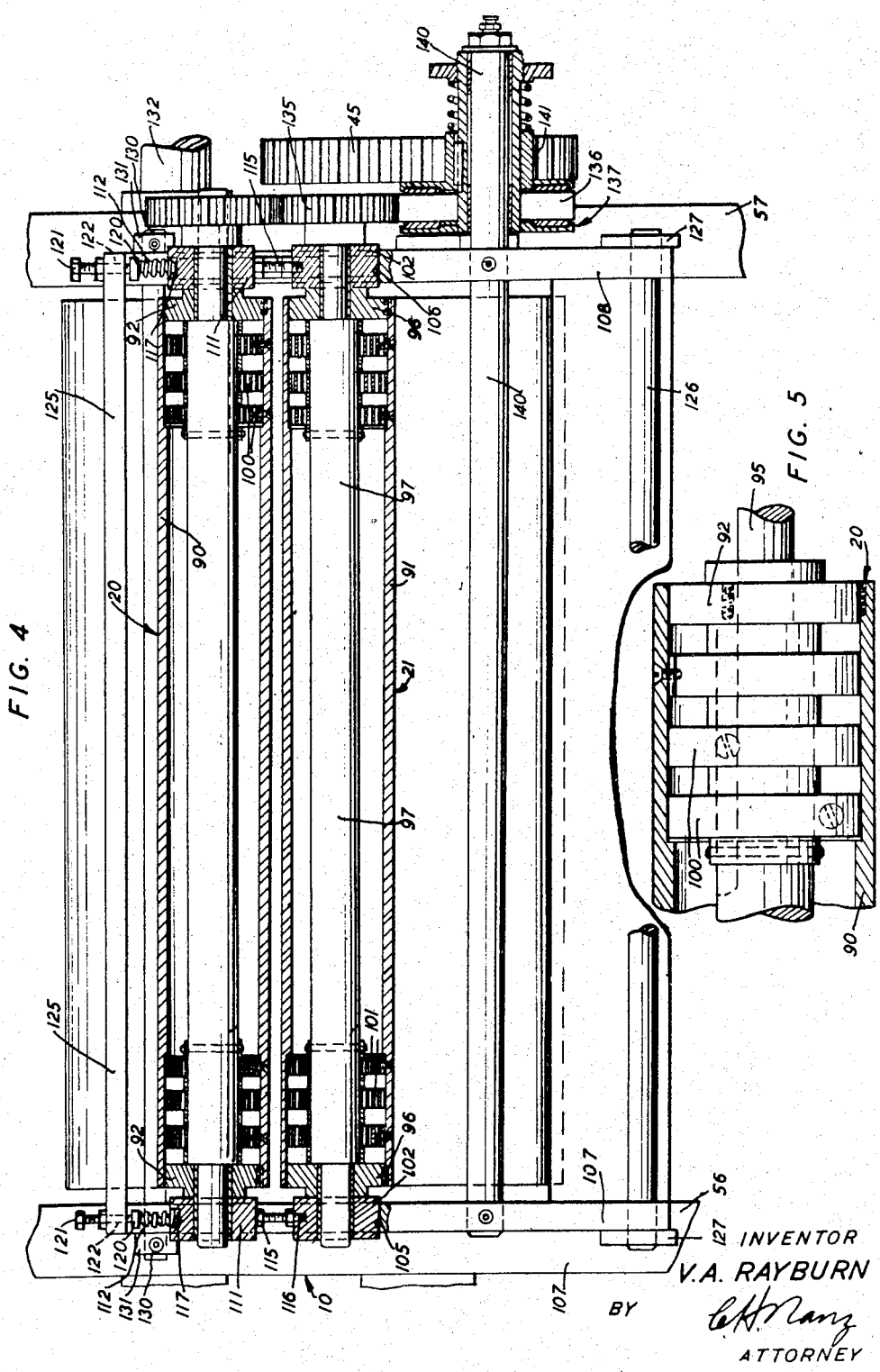

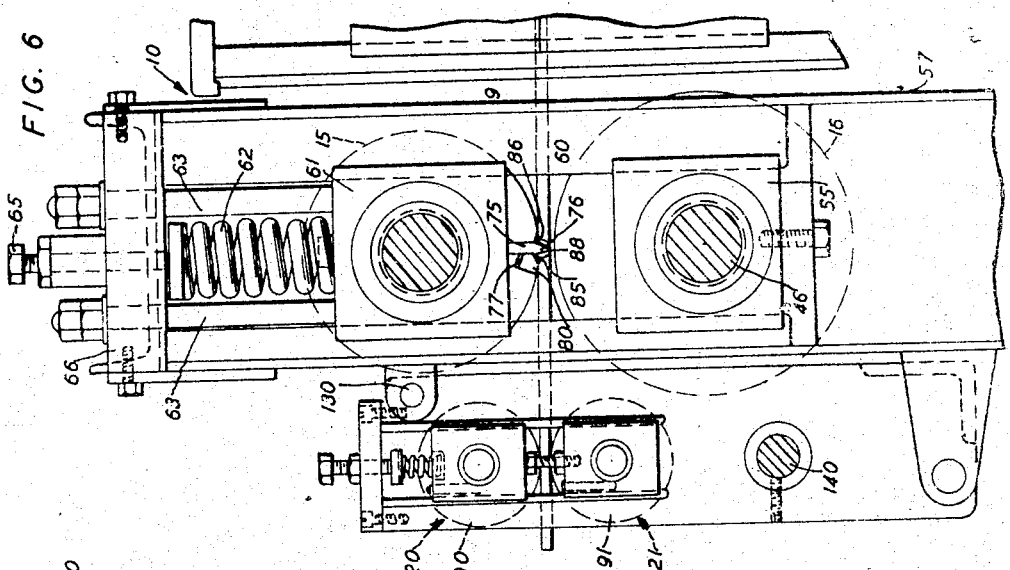
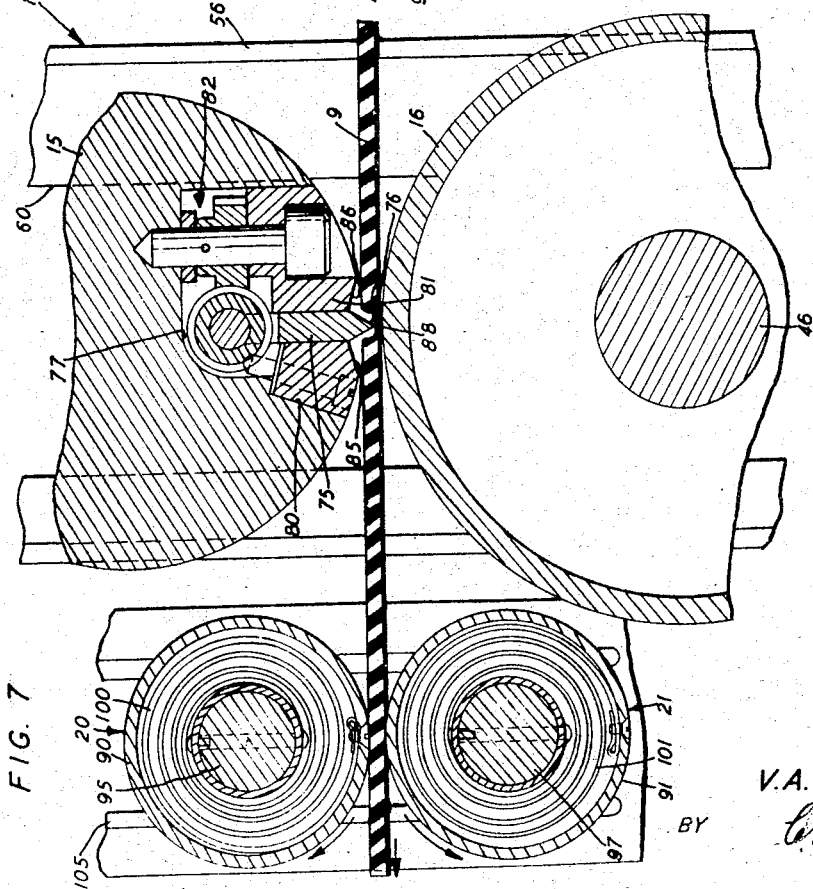

Patented Oct. 28, 1947

2,429,945

UNITED STATES PATENT OFFICE 2,429,945

METHOD OF AND APPARATUS FOR SHEARING STRIPS OF PLASTIC MATERIAL

Vincent A. Rayburn, Baltimore, Md., assignor to Western Electric Company, Incorporated, New York, N. Y., a corporation of New York Application August 14, 1945, Serial No. 610,835

18 Claims. (Cl. 164—68)

This invention relates to methods of and apparatus for shearing strips of plastic material and has for its object the provision of new and improved methods of and apparatus for shearing such strips.

In the preparation of strips of plastic material, such as rubber, or rubber-like materials, the plastic material is milled and is frequently sheeted off in long strips, which must be cut into short segments for convenience in subsequent handling and processing. In the past, it has been difficult to shear such strips into segments while advancing the strips continuously.

A method embodying the invention comprises reducing a portion of a strip of plastic material into a membrane, and placing the portions of the strip adjacent to the membrane under tension to rupture the membrane.

An apparatus forming one embodiment of the invention comprises opposed means for reducing a portion of a strip of plastic material into a membrane and means for placing under tension the portions of the strip adjacent to the membrane, whereby the membrane is ruptured.

In practicing the invention, a strip of plastic material is advanced by a pair of inrunning feed rolls to a blade roll and an anvil roll at a predetermined rate of speed. A blade is secured to the blade roll, and the blade roll and the anvil roll are rotated in inrunning directions at rates of speed at which they tension the portion of the strip between them and the feed rolls. A pair of cylindrical shells are driven in inrunning directions by a plurality of spiral torsion springs at a rate of speed at which the shells tend to advance from the blade roll and the anvil roll at a rate of speed substantially greater than that at which the strip is advanced by the blade roll and the anvil roll so that the springs wind up and tension the portion of the strip between the blade and the anvil rolls and the shells. After the strip is tensioned between the blade and the anvil rolls and the feed rolls and between the blade and the anvil rolls and the shells, the blade pinches the strip leaving a membrane which is pinched against the anvil roll by the blade. The edge of the blade is moved at a different rate of speed than that of the anvil roll so that the blade rubs the membrane over the anvil roll. The pinching and the rubbing of the membrane and the tension imparted to the strip rupture the membrane to form a sheared segment of the strip, and the springs unwind to cause the shells to withdraw the sheared segment of the strip therefrom rapidly.

A complete understanding of the invention may be obtained from the following detailed description of a method and an apparatus constituting specific embodiments thereof, when read in conjunction with the appended drawings, in which Fig. 1 is a front view of an apparatus forming one embodiment of the invention;

Fig. 2 is a vertical section taken along line 2—2 of Fig. 1;

Fig. 3 is an enlarged, fragmentary, top plan view of the apparatus;

Fig. 4 is an enlarged, fragmentary, front view in partial section of the apparatus;

Fig. 5 is an enlarged, fragmentary, horizontal section taken along line 5—5 of Fig. 3;

Fig. 6 is an enlarged, fragmentary, vertical section taken along line 6—6 of Fig. 3, and Fig. 7 is an enlarged fragmentary vertical section taken along line 7—7 of Fig. 3.

Referring now in detail to the drawing, a strip 9 (Fig. 2) made of plastic material, such as an insulating compound containing rubber or a rubber-like material, is advanced through a shear 10 to sever the strip 9 into segments. The shear 10 includes a pair of inrunning feed rolls 11 and 12, which feed the strip 9 into the bite of shear rolls 15 and 16 (Fig. 1). The roll 15 is a blade roll, and the roll 16 is an anvil roll. The shear rolls advance the strip to a pair of inrunning tailer rolls 20 and 21.

An idler gear 22 (Fig. 2) secured to an idler shaft 25 engages a gear 26 secured to a drive shaft 27 and is driven by the shaft 27, which is driven by suitable driving means (not shown) in a counterclockwise direction, as viewed in Fig. 2. A gear 30 secured to the drive shaft 27 engages a gear 31 of a suitable adjustable friction clutch 32, which is mounted on a bearing post 25, and serves to transmit a predetermined amount of force without slipping to a gear 36, which is also mounted on the bearing post 35. The gear 36 meshes with a gear 37, which in turn meshes with a gear 40. The gear 40 is secured to a shaft 41 upon which the feed roll 11 is mounted and the gear 37 is secured to a shaft 42 upon which the feed roll 12 is mounted. When the shaft 27 is driven at a predetermined rate of speed, the feed rolls 11 and 12 are driven in opposite directions at equal predetermined rates of speed and advance the strip 9 to the left, as viewed in Fig. 2.

A gear 45 secured to a shaft 46, which mounts the anvil roll 16 thereon, meshes with a gear 47 rigidly connected to the shaft 25 and drives the shaft 46 when the shaft 25 is driven, whereby the anvil roll is rotated. A gear 48 (Fig. 1) secured to the shaft 46 meshes with a gear 50 secured upon a shaft 51 upon which the blade roll 15 is mounted.

The shaft 46 is rotatably mounted in slotted journal boxes 55—55, of which one is shown in Fig. 6. The journal boxes 55—55 are bolted to side frame members 56 and 57 (Fig. 1) at the bottom of guideways formed therein, which are illustrated by a guideway 60 (Fig. 6). The shaft 51 is mounted in slotted journal boxes 61—61 one of which is shown in Fig. 6. The slotted journal boxes 61—61 are pressed toward the slotted journal boxes 55—55 by strong compression springs 62—62 (Fig. 1). The compression springs 62—62 (Fig. 1) are positioned between the journal boxes 61—61 (Fig. 6) and adjusting bolts 65—65 (Fig. 1) secured adjustably to a tie cap 66. The bolts 65—65 may be adjusted to vary the compressive forces placed upon the compression springs 62—62.

The journal boxes 61—61 (Fig. 6) are urged toward the journal boxes 55—55, whereby the blade 15 is urged toward the anvil roll 16. However, the movement of the blade roll toward the anvil roll is limited by adjustable stay rods 63—63. Tubular posts 67—67 (Fig. 1) are secured adjustably to journal boxes 71—71 mounted on the ends of the shaft 46, and engage journal boxes 70—70 mounted on the ends of the shaft 51. Compression springs 72—72 urge the journal boxes 70—70 away from the tubular posts 67—67 so that the shaft 51 is maintained against the upper halves of the journal boxes 61—61.

A blade 75 (Fig. 7) having a blunt severing edge 76 formed thereon is secured by a clamping bar 80 in a slot 77 formed in the blade roll 15, and an adjusting mechanism 82, which is more fully described in copending application Serial No. 610,832, filed August 14, 1945, for Methods of and apparatus for shearing articles, serves to adjust the position of the blade bar 75 (Fig. 7) to vary the distance which the blade 76 thereof projects beyond the periphery of the blade roll. The clamping bar 80 is provided with a relieved portion 85 adjacent to the blade 75 and the blade roll has a relieved portion 86 positioned adjacent to the blade.

When the drive shaft 27 (Fig. 2) is driven, the shear rolls 15 and 16 (Fig. 6) are rotated at peripheral rates of speed at which they tend to advance the strip 9 from the feed rolls 11 and 12 at a rate of speed approximately 20% faster than that at which the feed rolls advance the strip, whereby any slack accumulation due to sag is removed and the portion of the strip between the feed rolls and the shear rolls is tensioned. The rate of speed of the blade roll 15 is such that the linear rate of speed of the severing edge 76 of the blade 75 is from 35% to 50% greater than the peripheral rate of speed of the anvil roll 16. This, plus the fact that the gear 50, which drives the blade roll, is driven by the gear 48, which is rigidly connected with the anvil roll, eliminates all backlash between the gears 50 and 51. Hence, when the blade engages the strip 9, it rubs the strip over the anvil roll. The blunt severing edge serves to pinch the strip to a membrane 88 when it is moved to the position shown in Fig. 6, in which position the blunted severing edge compresses the membrane.

The tailer rolls 20 and 21 (Fig. 4) include cylindrical shells 90 and 91, respectively. The cylindrical shell 90 is rotatably mounted by collars 92—92 upon a shaft 95 and the cylindrical shell 91 is similarly mounted by collars 96—96 upon a shaft 97. A plurality of spiral torsion springs 100—100 bolted to the cylindrical shell 90 connect the cylindrical shell 90 to the shaft 95, and a plurality of spiral torsion springs 101—101 bolted to the cylindrical shell 91 connect the cylindrical shell 91 to the shaft 97. The outer end of each of the spiral springs 100—100 is connected to the shell 90 and the inner end thereof is connected to the shaft 95, and the spiral springs 101—101 are similarly connected to the shaft 97 and the cylindrical shell 91. The direction in which the springs 100—100 are spiraled is opposite to that in which the springs 101—101 are spiraled, and is such that, when the shaft 95 is rotated in a clockwise direction, as viewed in Fig. 7, and the shell 90 is retarded by the strip, the spiral springs 100—100 are wound up as they rotate the shell 90. Similarly the spiral springs 101—101 rotate the cylindrical shell 91 in a counterclockwise direction when the shaft 97 is rotated in that direction and the shell 90 is retarded by the strip, and are wound up more tightly by the resistance of the shell 91.

The shaft 97 is rotatably mounted in slotted journal boxes 102—102, which are mounted in guideways 105 and 106 formed in frame members 107 and 108, respectively. A pair of slotted journal boxes 111—111 serve to mount the shaft 95 above the shaft 97 and are urged by compression springs 112—112 against adjustable stop screws 15—115 projecting from the journal boxes 102—102. The compression springs 112—112 are fitted in sockets 117—117 formed in the slotted journal boxes 111—111 and are pressed downwardly by spring centering seats 120—120 engaging adjusting bolts 121—121 positioned in tapped bores 122—122 formed in a tie cap 125.

A pintle 126 secured to lugs 127—127 projecting from the side frame members 56 and 57 serves to mount the frame members 107 and 108 pivotally upon the side frame members 56 and 57. Spring-pressed pins 130—130, which secure the frame members to lugs 131—131 projecting from the side frame members 56 and 57, may be withdrawn from the lugs 131—131 and the frame members 107 and 108 to permit the frame members to be pivoted away from the shear rolls 15 and 16 to provide access to the shear rolls.

A gear 132 secured to the shaft 95 meshes with a gear 135 secured to the shaft 97. The gear 135 meshes with a gear 136 of a suitable adjustable friction clutch 137, which is mounted upon a bearing post 140 and is secured to a gear 141 rotatably mounted on the bearing post 140 and meshes with the gear 45.

When the drive shaft 27 (Fig. 2) is driven, the gear 45 is driven and drives the gear 135 through the gear 140 and the friction clutch 137 and the gear 135 drives the gear 132 in a direction opposite to that in which the gear 135 is driven. This drives the shaft 95 in a clockwise direction, as viewed in Fig. 7, and the shaft 97 is driven in a counterclockwise direction. The shaft 95 and 97 through the spiral springs 100—100 and 101—101, respectively, drive the cylindrical shells 90 and 91, respectively, in opposite directions such as to cause the shells 90 and 91 to advance the strip 9 to the left, as viewed in Fig. 7.

The system of gearing described above for driving the tailer rolls 20 and 21 drives the shafts 95 and 97 at a rate of speed at which, if the tailer rolls were positively connected to the shafts 95 and 97, the peripheral rate of speed of the tailer rolls would be about twice that at which the shear rolls 15 and 16 serve to advance the strip 9. However, the tailer rolls are connected to the shafts 95 and 97 by the springs 100—100 and 101—101, respectively, so that the shells 90 and 91 are retarded by the strip. This winds up the springs 100—100 and 101—101 as the tailer rolls tend to advance the strip, whereby the portion of the strip between the shear rolls and the tailer rolls is placed under tension.

The friction clutch 137 (Fig. 4) is adjusted to a condition in which only a predetermined torque, which is equivalent to the total torque of the springs 100—100 and 101—101 when they are wound up, can be transmitted from the gear 141 to the gear 135 so that the force applied to the shafts 95 and 97 is limited to the wound up torque of the springs. The friction clutch 137 does not slip until the tension in the strip is equal to the wound up spring force, but slips if tension on the strip becomes greater than the predetermined torque so that the springs 100—100 and 101—101 will not be broken. If it is desired to lessen the tension applied by the tailer rolls to the portion of the strip between shear rolls and the tailer rolls, some of the springs 100—100 and 101—101 may be unbolted from the shells 90 and 91, respectively. If this is done, the friction clutch 137 may be adjusted to vary accordingly the torque transmitted thereby of the springs 100—100 and 101—101 are unbolted from the shells 90 and 91, respectively.

The feed rolls 11 and 12 are positioned as close as possible to the shear rolls 15 and 16 so that tension is rapidly built up in the portion of the strip 9 therebetween. Likewise, the tailer rolls 20 and 21 are positioned as close as possible to the shear rolls 15 and 16 so that the spiral torsion springs 100—100 and 101—101 are wound up rapidly to build up tension in the strip rapidly.

In the operation of the shear 10 (Fig. 6), the feed rolls 11 and 12 are rotated to advance the strip 9 at a predetermined rate of speed toward the shear rolls 15 and 16, which are driven by the system of gears described hereinabove at rates of speed at which they tend to advance the strip at a rate of speed approximately 20% greater than that at which the feed rolls normally advance the strip, whereby the portion of the strip between the feed rolls and the shear rolls is tensioned. The tailer rolls 20 and 21 engage the strip 9 and tend to advance it from the shear rolls at a rate of speed substantially twice that at which it is delivered from the shear rolls. This tensions the portion of the strip between the shear rolls and the tailer rolls, and the spiral torsion springs 100—100 and 101—101 (Fig. 4) are caused to be wound up by the friction of the strip against the tailer rolls.

When the blade 75 is rotated to the position shown in Fig. 7, it pinches the strip 9 to the membrane 88. Since the linear rate of speed of the edge 76 of the blade 75 is substantially faster than the peripheral rate of speed of the anvil roll 16, the membrane is rubbed over the periphery of the anvil roll 16. Also, the blade and the anvil roll compress the membrane therebetween. At this time, the spiral springs 100—100 and 101—101 have been wound up so that the cylindrical shells 90 and 91 place a high tension upon the portion of the strip between the tailer rolls and shear rolls, and the shear rolls 15 and 16 have built up a high tension in the portion of the strip 9 between the shear rolls and the feed rolls. The relieved portion 85 of the clamping bar 80 and the relieved portion 86 of the blade roll 15 provide clearance for the strip when the blade is in the position shown in Fig. 7 so that the tension of the membrane of the strip is not dissipated by contact of the clamping bar and the blade roll with the strip. The tension placed upon the membrane, the pressure exerted thereon by the edge 76 of the blade and the anvil roll and the rubbing of the membrane over the periphery of the anvil roll rupture the membrane.

After the membrane 88 has been ruptured, the severed portion of the strip 9 is shot rapidly to the left by the tailer rolls 20 and 21 due to the suddenly released energy of the wound up spiral springs 100—100 and 101—101. Simultaneously, the tension of the portion of the strip 9 between the shear rolls and the feed rolls is released, the feed rolls feed the new end of the strip to the shear rolls, and the shear rolls then feed the new end of the strip to the tailer rolls and the operation described hereinabove is repeated.

In the method of and the apparatus for shearing the strip 9 of plastic material described hereinabove, the strip is sheared into segments of equal lengths effectively and uniformly. The strip is advanced continuously and is rapidly sheared into segments. As the strip is continuously advanced the strip is pinched to a membrane, and the membrane is rubbed over the anvil roll and is placed under a high tension so that the membrane is ruptured. The sheared segment then is shot out rapidly by the tailer rolls.

The severing edge 76 of the blade 75 is blunt and may be maintained in excellent pinching condition very easily with little or no maintenance thereof. However, the severing edge together with the action of the anvil roll 16, the tailer rolls 20 and 21 and the feed rolls 11 and 12 serve to shear the strip 9 at each revolution of the blade roll 15. Also the tension placed upon the membrane 88 of the strip 9 during the shearing operation obviates the necessity of great compressive forces between the blade and the anvil roll.

The apparatus and methods embodying this invention are especially useful for severing strips of plastic materials, such as compounds made of rubber or synthetic rubber-like materials. Thus, strip of insulating and jacketing compounds, such as are used to form coverings on electrical conductors and cables, may be readily cut into slabs that are suitable for further processing in accordance with known methods. Such compounds may include natural rubber, or "neoprene" (polymerized chloroprene), Buna or other synthetic rubber-like material, or mixtures thereof.

What is claimed is:

1. The method of shearing strips of plastic material, which comprises reducing a portion of a strip of plastic material to a small cross-sectional area, and placing the portions of the strip on opposite sides of and adjacent to said portion under tension to rupture it as that portion is reduced.

2. The method of shearing strips of plastic material, which comprises simultaneously reducing to a small cross-sectional area, a portion of a strip of plastic material between opposed severing elements to leave a membrane, and placing the portions of the strip on both sides of the severing elements under tension.

3. The method of shearing strips of plastic material, which comprises advancing a strip of plastic material at a predetermined rate of speed, reducing the strip to a membrane at a point in advance of said predetermined point, placing the portion of the strip on the approach side of the membrane under tension, and simultaneously placing the portion of the strip on the recess side of the membrane under the tension, whereby the membrane is ruptured.

4. The method of shearing strips of plastic materials, which comprises frictionally gripping a strip of plastic material at a predetermined point, advancing the strip past said point at a predetermined rate of speed, frictionally gripping and advancing the strip at a second point positioned in advance of the first-mentioned point at a rate of speed greater than said rate of speed, whereby tension is placed upon the portion of the strip between said points, frictionally gripping and advancing the strip of material at a third point which is in advance of the last-mentioned point at a greater rate of speed than that at which it is advanced at the second point, whereby the portion of the strip between the second point and the third point is placed under tension, reducing the strip to a membrane at the second point, and rubbing the membrane, whereby the membrane is ruptured.

5. The method of shearing strips of plastic material, which comprises pinching a strip of plastic material to a membrane between opposed severing elements, placing the portions of the strip adjacent to the membrane under tension, and rubbing the membrane to rupture it.

6. An apparatus shearing strips of plastic material, which comprises opposed means for reducing a portion of a strip of plastic material to a membrane, and means operable simultaneously with the strip-reducing means for placing the portions of the strip on opposite sides of and adjacent to the membrane under tension, whereby the membrane is ruptured.

7. An apparatus for shearing strips of plastic material, which comprises a pair of opposed resiliently driven tailer rolls for advancing a strip of plastic material therebetween, and means for retarding the strip against the action of the tailer rolls, including a pair of opposed severing elements for reducing the strip to a membrane which is ruptured by the tension of the strip.

8. An apparatus for shearing strips of plastic material, which comprises means for stretching between two points a portion of a strip of plastic material, and opposed severing means for pinching a portion of the strip stretched by the stretching means to a membrane, whereby the membrane is snapped apart.

9. An apparatus for shearing strips of plastic material, which comprises a pair of parallel shafts, a pair of parallel cylinders mounted rotatably on the parallel shafts, a plurality of spiral torsion springs positioned in the cylinders for connecting the shafts resiliently to the cylinders, means for rotating the shafts in opposite directions, whereby the cylinders are rotated in opposite directions and serve to advance a strip of plastic material therebetween, a pair of feed rolls spaced from the cylinders, means for rotating the feed rolls to advance the strip of material to the cylinders at a rate of speed less than said rate of speed, a pair of opposed shear rolls positioned between the cylinders and the feed rolls, a blade having a severing edge formed thereon secured to one of the shear rolls, and means for driving the shear rolls at a rate of speed at which they advance the strip of material at a rate of speed intermediate those at which the strip is advanced by the cylinders and the feed rolls, whereby the portion of the strip between the cylinders and the feed rolls is placed under tension and is ruptured when engaged by the blade.

10. An apparatus for shearing strips of plastic material, which comprises a pair of feed rolls, means for driving the feed rolls in opposite directions to advance a strip of plastic material therebetween at a predetermined rate of speed, a pair of shear rolls for engaging the strip therebetween, means for rotating the shear rolls at rates of speed which are greater than that of the feed rolls to advance it from the feed rolls and place it under tension, a blade secured to one of the shear rolls for reducing a portion of the strip to a membrane when the blade is rotated into engagement with the strip, a pair of tailer rolls positioned in advance of the shear rolls, means including a plurality of torsion springs for driving the tailer rolls at predetermined rates of speed at which rates the tailer rolls tend to advance the strip from the shear rolls at a rate of speed greater than that at which it is advanced by the shear rolls, whereby the portion of the strip between the shear rolls and the tailer rolls is placed under tension and the membrane is ruptured.

11. In an apparatus for shearing strips of plastic material including means for advancing at a predetermined rate of speed for pinching to a membrane a strip of plastic material, means for rupturing the membrane portion of the strip, which comprises a pair of shafts, a pair of rolls mounted rotatably on the shafts, impositive means for transmitting power from the shafts to the rolls, and means for driving the shafts at rates of speed at which the resilient means tend to drive the rolls at rates of speeds at which they tend to advance the strip at a greater rate of speed than that of the strip advancing means, whereby the strip is tensioned and the membrane is ruptured.

12. An apparatus for severing strips of plastic material, which comprises means for pinching periodically a strip of plastic material to a membrane, means positioned on one side of the pinching means for advancing the strip to the pinching means at a predetermined rate of speed, and resiliently driven gripping means positioned on the opposite side of the strip-severing means for tending to advance the strip at a greater rate of speed than that of the strip-advancing means.

13. An apparatus for shearing strips of plastic material, which comprises means for periodically pinching to a small cross-sectional area, a strip of plastic material, means positioned on one side of the pinching means for feeding the strip to the pinching means at a predetermined rate of speed, a pair of parallel shafts positioned on the opposite side of the pinching means, a pair of hollow cylinders mounted rotatably on the shafts, a plurality of spiral torsion springs coiled in one direction for connecting one of the cylinders to one of the shafts, a plurality of spiral torsion springs coiled in the other direction for connecting the other cylinder to the other shaft, driving means for rotating the shafts in opposite directions to advance the strip from the pinching means, said driving means and springs tending to rotate the cylinders at a rate of speed greater than said rate, whereby the strip is tensioned, and means for limiting the torque applied by the driving means to the shafts.

14. An apparatus for shearing strips of plastic material, which comprises a pair of opposed feed rolls, means for rotating the feed rolls to advance a strip of plastic material at a predetermined rate of speed, a pair of shear rolls positioned in advance of the feed rolls for engaging the strip as it is advanced thereto by the feed rolls, means for pressing one of the shear rolls toward the other, a blade having a severing edge secured to one of the shear rolls in a position in which the severing edge projects beyond the periphery of that shear roll, means for rotating the shear rolls at rates of speed at which they tend to advance the strip from the feed rolls at a rate of speed greater than said predetermined rate, said last-mentioned rotating means serving to rotate the shear rolls at rates of speeds at which the rate of speed of the severing edge of the severing bar is substantially greater than the peripheral speed of the shear roll to which it is not secured, a pair of parallel shafts positioned in advance of the shear rolls, a pair of hollow cylinders mounted rotatably on the shafts, a plurality of oppositely coiled spiral torsion springs positioned in the hollow cylinders for connecting the cylinders to the shafts, and means for rotating the shafts to rotate the cylinders through the springs, said last-mentioned rotating means serving to rotate the shafts at rates of speed at which the hollow cylinders tend to advance the strip from the shear rolls at a rate of speed substantially greater than that at which the strip is advanced by the shear rolls.

15. For use with a shear having means for reducing to a membrane a portion of a strip of material, means for tensioning the strip, which comprises a pair of tailer rolls for engaging a portion of the strip extending beyond the shear, and means for driving the tailer rolls impositively to tension the membrane.

16. For use with a shear having means for advancing at a predetermined rate of speed and for pinching to a membrane a portion of a strip of plastic material, means for tensioning a portion of the strip advanced beyond the strip, which comprises a pair of rolls for engaging said portion of the strip, and resilient means for driving at least one of the rolls at a greater rate of speed than that of the advancing means to tension the membrane.

17. For use with a pair of inrunning shear rolls for advancing a strip of plastic material at a predetermined speed and for reducing the strip periodically to a membrane, means for rupturing the membrane, which comprises a pair of shafts positioned close to the shear rolls, a pair of cylindrical shells rotatably mounted on the shafts, a plurality of spiral torsion springs for connecting the shells to the shafts, and means for rotating the shafts in opposite inrunning directions at a rate of speed at which the shafts tend to rotate the shells through the springs at a rate of speed greater than that of the shear rolls, whereby the shells impart tension to the strip to rupture the membrane when it is formed by the shear rolls.

18. For use with a shear for advancing a strip of material at a predetermined rate of speed, a tailer roll mechanism which comprises a pair of shafts positioned close to the shear, a pair of cylindrical shells mounted rotatably on the shafts, a plurality of spiral torsion springs for connecting the shells to the shafts, and means for rotating the shafts in opposite inrunning directions at a rate of speed at which the shafts tend to rotate the shells through the springs at a rate of speed greater than that at which the material is advanced by the shear.

VINCENT A. RAYBURN.

REFERENCES CITED

The following references are of record in the file of this patent:

UNITED STATES PATENTS

| Number | Name | Date |
|---|---|---|
| 1,958,137 | Fowler | May 8, 1934 |

Certificate of Correction

Patent No. 2,429,945.                                                          October 28, 1947.

VINCENT A. RAYBURN

It is hereby certified that errors appear in the printed specification of the above numbered patent requiring correction as follows: Column 1, line 36, after the syllable "vance" insert the words *the strip*; column 4, line 32, for "15—115" read *115—115*; column 7, lines 2 and 3, claim 3, strike out the words "point in advance of said"; same line 3, after "point" and before the comma, insert *simultaneously with the reduction of the strip*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.*